(12) United States Patent
Bratten

(10) Patent No.: US 6,277,276 B1
(45) Date of Patent: Aug. 21, 2001

(54) FILTER APPARATUS WITH MAGNETIC SEPARATION

(76) Inventor: Jack R. Bratten, 5970 St. James Dr., West Bloomfield, MI (US) 48322

( * ) Notice: Subject to any disclaimer, the term of this patent is extended or adjusted under 35 U.S.C. 154(b) by 0 days.

(21) Appl. No.: 09/502,145

(22) Filed: Feb. 11, 2000

(51) Int. Cl.$^7$ .................................................. B01D 35/06
(52) U.S. Cl. ........................ 210/223; 210/222; 210/396; 210/400; 210/416.1
(58) Field of Search ..................................... 210/222, 223, 210/695, 396, 400, 416.1; 209/218, 226; 198/690.1

(56) References Cited

U.S. PATENT DOCUMENTS

| | | |
|---|---|---|
| 2,471,044 | 5/1949 | Scrivener . |
| 3,357,559 | 12/1967 | Israelson . |
| 3,428,179 | 2/1969 | Boyd, Jr. et al. . |
| 3,537,586 | 11/1970 | Hunkeler . |
| 3,834,542 | 9/1974 | Linstruth . |
| 3,985,647 | 10/1976 | Smith . |
| 4,031,011 | 6/1977 | Dorgathen . |
| 4,209,403 | 6/1980 | Dorgathen . |
| 4,261,826 | 4/1981 | Dorgathen . |
| 4,370,228 * | 1/1983 | Tashiro et al. ........................ 210/400 |
| 4,394,264 | 7/1983 | Schimion et al. . |
| 5,624,579 * | 4/1997 | Bratten ................................. 210/400 |
| 6,056,879 | 5/2000 | Schaaf et al. . |
| 6,059,535 | 5/2000 | Wichmann et al. . |

FOREIGN PATENT DOCUMENTS 41 30 421 C2   6/1993   (DE) .

* cited by examiner

Primary Examiner—David A. Reifsnyder
(74) Attorney, Agent, or Firm—John R. Benefiel

(57) ABSTRACT

A filter incorporates a magnetic separator comprised of a series of side by side but spaced apart permanently magnetized bars interconnected to form a train, movably mounted through a tank into which is introduced liquid contaminated with ferromagnetic particles to be removed. The bar train includes a section overlying a vacuum box in the tank which also is overlain with a filter media to remove particles not removed by the separator. The bar train may be mounted to a flight conveyor included in the filter, or alternatively have its own support and drive. A scraper station is located at a discharge end of the tank for removal of accumulated particles from the bars. Scraper blocks are slidably mounted on the bars and remain there throughout the machine cycle, each of the blocks successively engaged with a plate on a band cylinder as the bars are moved into the scraping station. The cylinder is stroked to wipe the bars at the scraper station.

10 Claims, 4 Drawing Sheets

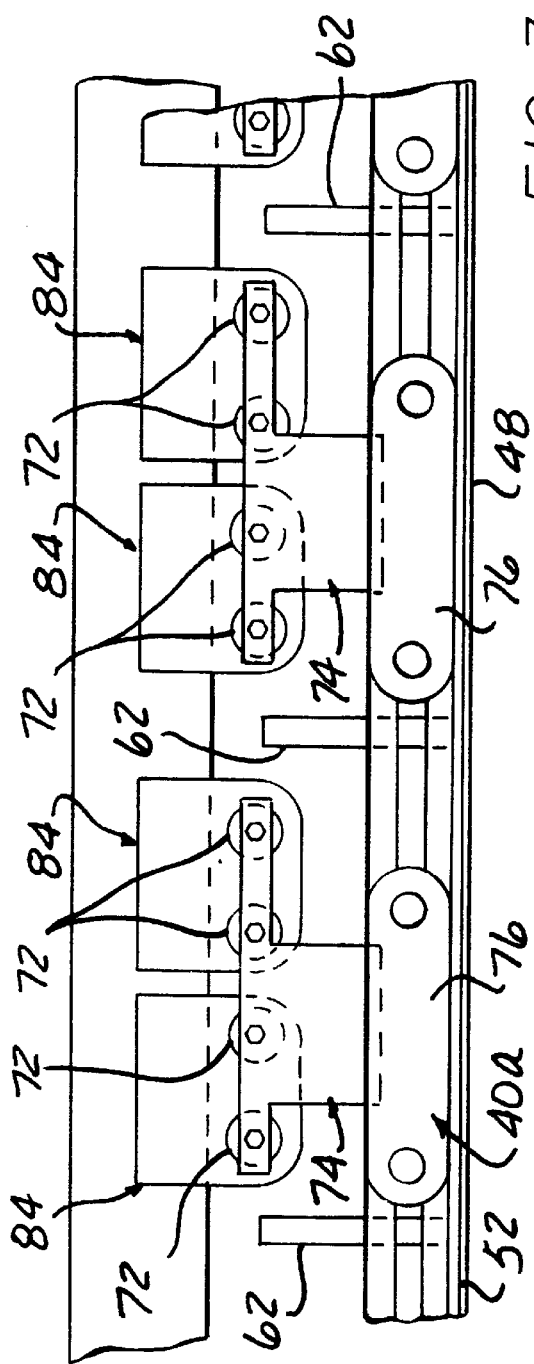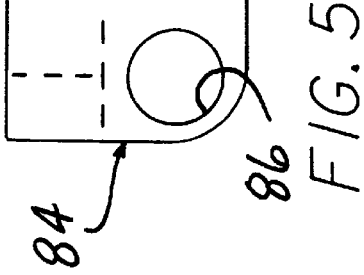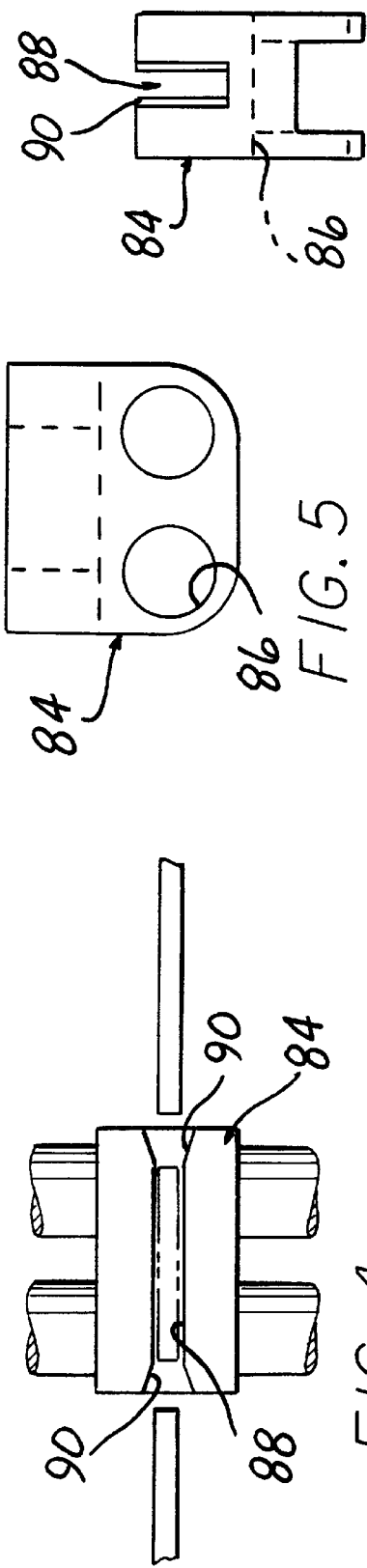

FILTER APPARATUS WITH MAGNETIC SEPARATION

BACKGROUND OF THE INVENTION

This invention concerns industrial filters of a type designed to filter cutting fluids. These fluids are used in the machining of metal parts, such as engine blocks, manifolds, cylinder heads, etc. to cool and lubricate, and to carry off chips, etc. The cutting fluids are directed at the parts during machining, and in mass production installations are collected for filtration and reuse.

Large quantities of metal particles along with grit from grinding and other material, are typically generated which must be removed by the filter apparatus. In some operations such as honing, very fine metal particles are generated which tend to quickly clog the filter media, requiring increased filter capacity and/or reduced filter flow rates. The larger metal turnings sometimes cause tearing of the media. A type of filter apparatus widely used for this application comprises a tank into which the contaminated liquid is introduced and within which a media sheet material is advanced over a vacuum box. Liquid is drawn through the media sheet section overlying the vacuum box to be filtered.

The media and conveyor are indexed periodically to bring a fresh media section over the vacuum box.

A flight conveyor extending over the media is driven to assist in moving large quantities of filtered solids out of the tank.

Applicant has previously patented a method using such apparatus featuring a combination of a permanent and disposable sheet material filter media. See U.S. Pat. No. 5,624,579, issued on Apr. 29, 1997, which describes this filter.

If the metal particles could be removed from the liquid, the filter load could be greatly reduced, such that flow to the filter could be increased and, a smaller filter therefor used, and/or the indexing rate reduced.

This is particularly true where fine metal particles are present, such as with honing machines. These very fine particles are accompanied with oils which tend to be drawn to the metal particles, the oils tend to clog the filter media.

Magnetic separators have previously been devised which use permanently magnetized elements which attract ferromagnetic particles to remove the same from suspension in the liquid in a tank. Such separators have heretofore been separate from the primary filter, increasing the floor space required.

Magnetic separator elements have typically comprise an array of elongated permanently magnetized bars arranged side by side in a tank with intervening spaces through which the liquid is circulated. The metal particles are attracted to the magnetized bars, which are periodically scraped off, the scrapings collected by a conveyor removing the same from the tank.

Uniform circulation of liquid over the bars have been difficult to achieve, as the liquid tends to flow directly to a tank outlet, creating localized regions of higher and lower flow rates. Higher flow velocities tend to allow metal particles to escape the magnetic attraction of the bars and pass out of the separator.

Furthermore, scraping mechanisms heretofore employed have been bulky, using long power cylinders projecting to one side of the tank, and have not provided a particularly effective scraping action.

It is an object of the present invention to provide a filter method and apparatus of the type described which incorporates a magnetic separator to simplify and reduce the size of the combined apparatus.

It is a further object to provide a magnetic separator of improved performance.

It is yet another object to provide an improved scraper mechanism for a magnetic separator.

SUMMARY OF THE INVENTION

These and other objects which will become apparent upon a reading of the following specification and claims are achieved by a combined vacuum filter and magnetic separator provided by interconnecting a series of magnetized bars to form a train of bars able to be advanced over the vacuum box so that the distributed liquid flow to the vacuum box uniformly flows over the array of magnetized bars at a relatively low flow rate. The uniform dispersed flow of liquid to the vacuum box insures distributed low velocity flow across the magnetized bars extending over the vacuum box, such that there is very effective pickup of metal particles by the bars.

The liquid then passes through a permanent media belt and, optionally, also through a disposable media sheet both driven through the tank by a flight conveyor.

The magnetized bar array is recirculated through the tank to the discharge end of the tank where a scraper mechanism successively engages the magnetized bars to scrape off the accumulated metal particles from each bar in the series.

According to another feature of the invention, the magnetic bars are either mounted to a flight conveyor to be recirculated back around the tank by the conveyor drive, or by a separate guide and drive arrangement.

The invention also features an improved scraper mechanism, comprising a series of polymeric scraper blocks, each mounted on respective magnetized bars in the series. A slot in each block receives a pusher arm of the scraper mechanism as the bars are successively indexed into a scraper station, the pusher arm comprised of a flat bar fit into the rectangular slot, to hold the scraper block square to the bar axis for true traversing movement when driven back and forth by an index cylinder. The cylinder is preferably an internal band cylinder which may be mounted coextensively with the bars so as to be able to be confined entirely within the tank.

The scraper mechanism is located at the discharge end of the filter tank so that when the scraper blocks scrape the accumulated particles onto an unmagnetized region at a far end of each bar, the scrapings fall through the discharge chute and are collected together with the material discharged by the flight conveyor and media.

DESCRIPTION OF THE DRAWINGS

FIG. 3 is an enlarged fragmentary end view of a section of the magnetized bar array, flight conveyor, and media sheets shown in FIG. 2.

FIG. 4 is a top view of a typical scraper block mounted on each pair of adjacent magnetized bars.

FIG. 5 is a side view of the scraper block shown in FIG. 4.

FIG. 6 is an end view of the scraper block shown in FIG. 4.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
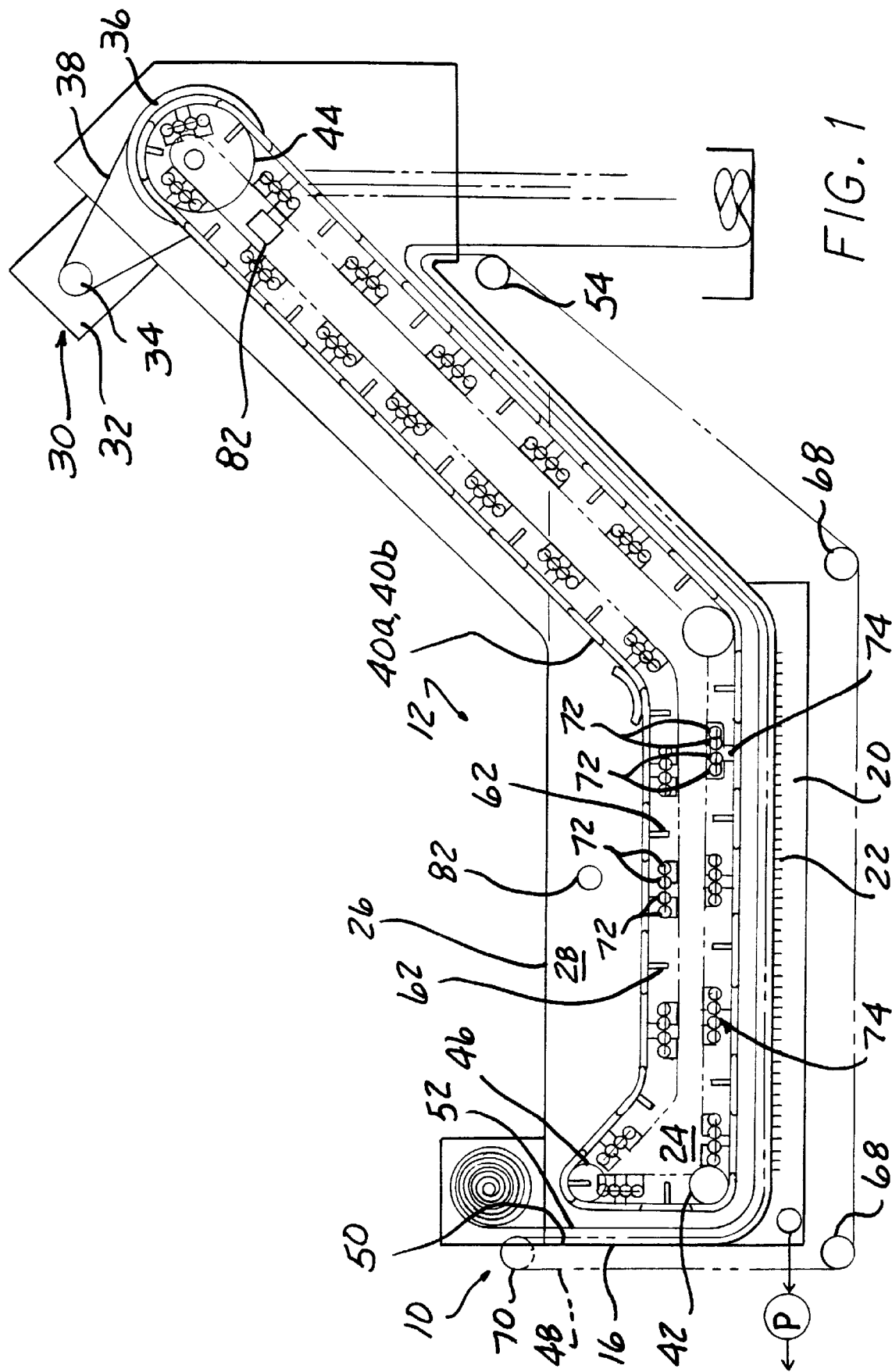
FIG. 1 is a simplified diagrammatic view of a filter apparatus according to the present invention.

Referring to the drawings, and particularly, FIG. 1, a filter apparatus 10 of the same general type described in U.S. Pat. No. 5,624,579 is shown, which includes an open tank 12 adapted to receive liquid to be filtered from a utilizing system (not shown), normally operating with a controlled liquid level by means of suitable valving and controls well known to those skilled in the art.

The particular configuration of tank shown includes a vertical rear wall 16 connected via a rounded corner to an upwardly sloping bottom 18. A vacuum or clean liquid box 20 is mounted beneath, the tank bottom 18 with a perforate bottom section 22 allowing an outflow of liquid from the tank interior 24 into a collection chamber defined by the vacuum box 20 induced by a pressure differential created by operation of a pump P having an inlet connected to the vacuum box 20.

The inclined tank bottom 18 terminates at the height of the horizontal top edge 26 of the pair of sidewalls 28, together defining the confined volume of the interior 24 of the tank 12.

Each sidewall 28 extends beyond the upper end of the tank bottom 18 to create a mounting and receiving structure for a flight conveyor indexing drive assembly 30 for a flight conveyor 50 circulated through the tank conveyor. Such drive assembly can include a motor 32 and belt or chain rotating a main sprocket 34, in turn driving drive sprockets 36 with a chain 38 to periodically enable an incremental advance of the flight conveyor loops 40A, 40B to bring a fresh segment of a filter media sheet 48 over the perforate section 22. Suitable indexing drive (and flow valving controls) are well known to those skilled in the art, and are therefore not here described.

A pair of endless conveyor chain loops 40A, 40B (FIG. 2) are guided for circulation around the interior 24 of the tank 12, extending down the rear wall 16, around the sprockets 42, 44, both driven by main drive sprocket 36 and returning across the upper region of the tank interior 24 to second guide sprockets 46.

An endless or continuous permanent filter sheet media loop 48 is also provided, having one segment 50 which enters the tank interior 24 by descending the rear end wall 16, beneath the chain conveyor loops 40A, 40B.

The permanent sheet media 48 must be porous to enable filtration, and may be constructed or woven synthetic of natural fibers forming a fabric of suitable weave tightness for the particular filtering application, as well known to those skilled in the art.

While a pronounced separation is indicated in FIG. 1, it should be understood that this is for clarity of illustration only, and that the rear segment 50 of the permanent media 48 would be against the end wall 16 and that chain loops 40A, 40B would be immediately above, with the intermediate disposable filter media 52 optionally sandwiched between, as described further below.

The permanent sheet media 48 extends around the guide sprocket 42 and up the tank bottom 18, over the perforate section 22, to the end of the tank bottom 18. At this point, the permanent media 48 takes a divergent path from that of the conveyor chain loops 40A, 40B, passing down over a guide roller 54 located beneath the bottom 18. Accumulated solids are dumped as the surface is inverted and scraped off the permanent sheet media 48 by the scraper edge 56, collected as by a collector receptacle (or conveyor) 60 positioned below.

A jet spray manifold pipe (not shown) may be mounted extending across the width of the permanent sheet media 48 to provide washing of the media by jets directed at the backside as is well known in the art. The wash liquid is collected and may be returned to the tank 24 for filtration.

The permanent sheet media 48 then passes beneath the tank 12 and vacuum box 20, passing around guide rollers 68, up the outside of rear wall 16 to a guide roller 70 at the top of the rear wall 16 for reentry into the tank 12.

If a disposable media is not employed, indexing advance of the permanent sheet media is produced by direct frictional engagement of the chain conveyor loops 40A, 40B lying atop the permanent media 48 as they ascend the tank bottom 18. Flights 62 connect the loops 40A, 40B extending across the width of the permanent media 40 which serves to carry the weight of the solid material accumulating atop the permanent media 48 so that frictional advance of the filter media is easily enabled.

The divergent routing of the chain conveyor loops 40A, 40B and the permanent media belt loops 48 after leaving the tank 12 allows a disposable sheet media 52 to be inserted into the convergent space between the permanent media 48 and conveyor loops 40A, 40B at the point of entry at the rear wall 16 and advanced along with the permanent media 48 so as to lie along belt loop 48 as indexing advance atop the tank bottom 18 proceeds. In this instance, the conveyor loops 40A, 40B exert a frictional force on the disposable media 52 and the disposable media 52 exerts a frictional force on the permanent media 48, so as to be simultaneously advanced together when indexing occurs by frictional driving.

The disposable media 52 passes out of the tank 12 at the end of the bottom 18, where it may be collected for disposal.

Figure 2:
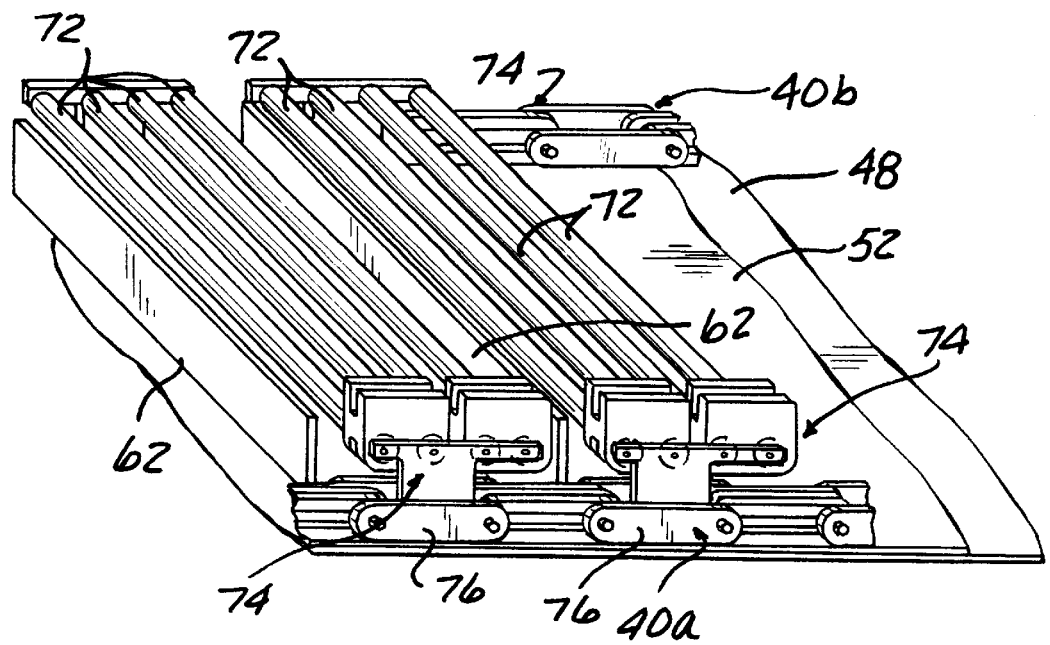
FIG. 2 is a fragmentary perspective view of a section of the magnetized bar train, flight conveyor and media belts used in the filter apparatus of FIG. 1.

FIG. 2 shows that the chain loops 40A, 40B are guided back around the upper region of the tank 12.

The filter media 52 are shown separated and in line form for clarity of illustration, as it should be understood that the lower segments of the chain conveyor loops 40A, 40B, the disposable media 52, and the permanent media 48 lie directly atop each other.

The edges of the permanent media 48 are preferably coated, as by a hot press impregnation with a urethane plastic. This will improve sealing and wear resistance.

According to the concept of the present invention, a magnetic separator is integrated into the filter apparatus 10, by providing a side by side spaced apart series of permanently magnetized bars 72 extending across the spacing between the chain convey loops 40A, 40B and interconnected together so as to form a train of bars 72 able to be advanced through the interior of the tank 12 in the same manner as the conveyor 50. The magnetized bars 72 in the embodiment shown in FIG. 1 are interconnected as by being directly mounted to the chain loops 40A, 40B in pair sets by means of brackets 74 welded to inboard chain links 76 intermediate the flights 62 of the flight conveyor 50 (best seen in FIGS. 2 and 3).

Thus, the train of magnetized bars 72 form a double layer extending between the inlet 80 and the perforate wall 22 and overlying filter sheet media 48, 52.

A distributed flow pattern will exist, by the generally diffuse flow out through the media 48, 52 and the perforate wall 22 of the vacuum box 20. Thus, a low velocity equalized distribution of dirty liquid will flow past over all of the magnetized bars 72 in that region of the tank interior 24 so that metal particles in the liquid will be collected more or less equally by all of the bars 72 in this region. This is much improved over prior magnetic separators in which the liquid flow tends to be concentrated in localized areas in being directed towards a small area outlet typical of prior art separators.

The sets of pairs of magnetized bars 72 are indexed together with the chain loops 40A, 40B until reaching a scraping station 82 located at the discharge end of the tank 12 and disposed over the collector 60.

Each pair of magnetized bars 72 carries a scraper block 84 constructed of a suitable high strength polymeric material such as Nylon so as to be freely slidable thereon by being received in holes 86 (FIG. 5) fit to the outside diameter of the magnetized bars 72.

The fit of the bars 72 in the holes 86 is loose enough to allow sliding but tight enough to be effective to scrape the entire surface of the bars 72 when slid down the lengths thereof. An intermediate clearance space 85 is formed between each end face of the blocks 84 so that half ring pairs 87 are formed. This allows any material entering the clearance space to escape rather than to be packed and jam the block 84 as could occur if the holes 86 extended the entire width of the block 84.

The top of each scraper block 84 is formed with a slot 88, which may have a tapered lead in section 90 at each end (FIGS. 4, 6).

Figure 7:
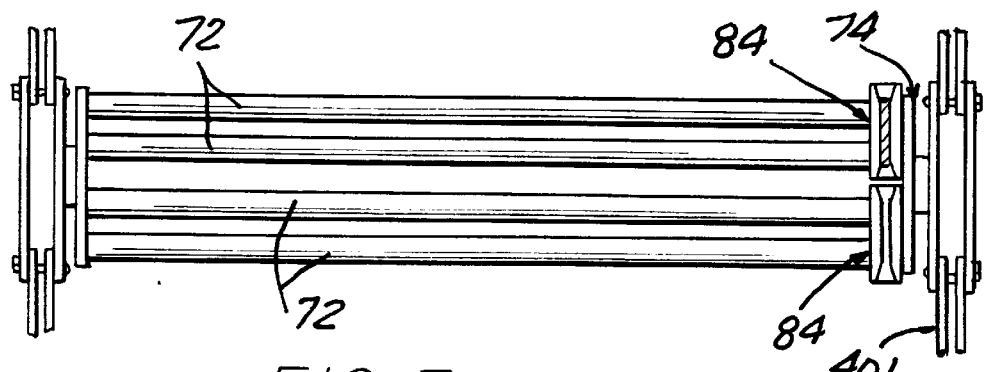
FIG. 7 is a plan view of a set of magnetized bars showing two scraper blocks in the home position.
Figure 8:
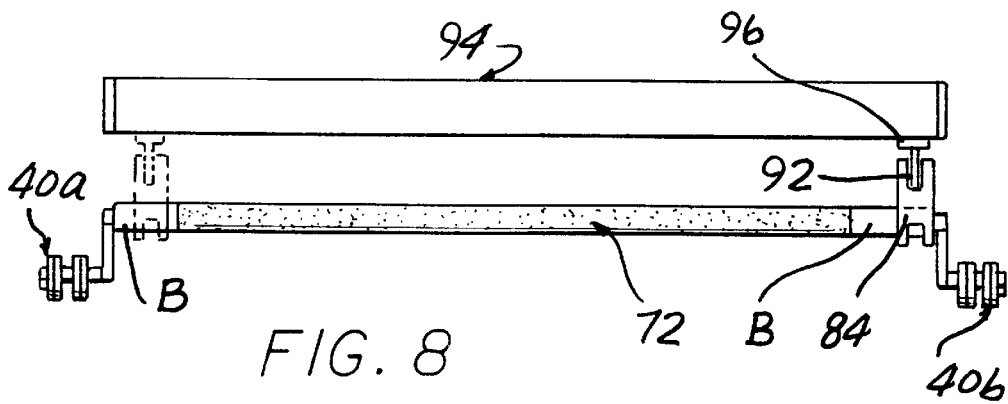
FIG. 8 is a front elevational view of the magnetized bars in the scraping station showing the associated indexing band cylinder.

The slots 86 are received on a guide bar 89 extending along the path fo the series of interconnected bars 72 so as to be aligned with a flat pusher plate 92 of an indexing band cylinder 94 located at the scraping station, so that as each adjacent pair of bars 72 are indexed into the scraping station the respective scraper block 84 is engaged with the pusher plate 92 (FIGS. 7, 8). It is noted that the indexing distance of the flight conveyor 50 must be matched to the distance between pairs of blocks 84.

The band cylinder 94 is of a commercially available type in which the output element extends through a lengthwise slot in the cylinder wall, along which it moves in either direction when being stroked. This eliminates the long actuator rod protruding from power cylinders of more conventional designs, saving space and allowing the cylinder 94 to be contained entirely within the space between the conveyor loops 40A, 40B.

It will be understood that suitable controls including timers, switches, valves, etc., will be utilized to produce periodic advance of the conveyor 50 and train of bars 72, which are well known to those skilled in the art.

The magnetized bars 72 are permanently magnetized only in the central section "A" so as to have unmagnetized sections "B" at either end. The scraper blocks 84 move into sections "B" when the cylinder 94 is operated to facilitate the removal of metal particles therefrom by the respective scraper blocks 84 traversing down each adjacent pair of magnetized bars 72.

The scraper blocks 84 are each returned to their home position by the cylinder 94 prior to the next index.

The flat pusher plate 92 fit to a flat sided slots 88 insures that the blocks 84 will be held in alignment with the longitudinal axis of the associated bars 72 to insure smooth sliding.

The use of a scraper block permanently associated with each bar reduces the wear as compared with typical prior designs in which a scraper or a pair of scrapers were located at a scraping station which were used to scrap all of the bars.

Figure 9:
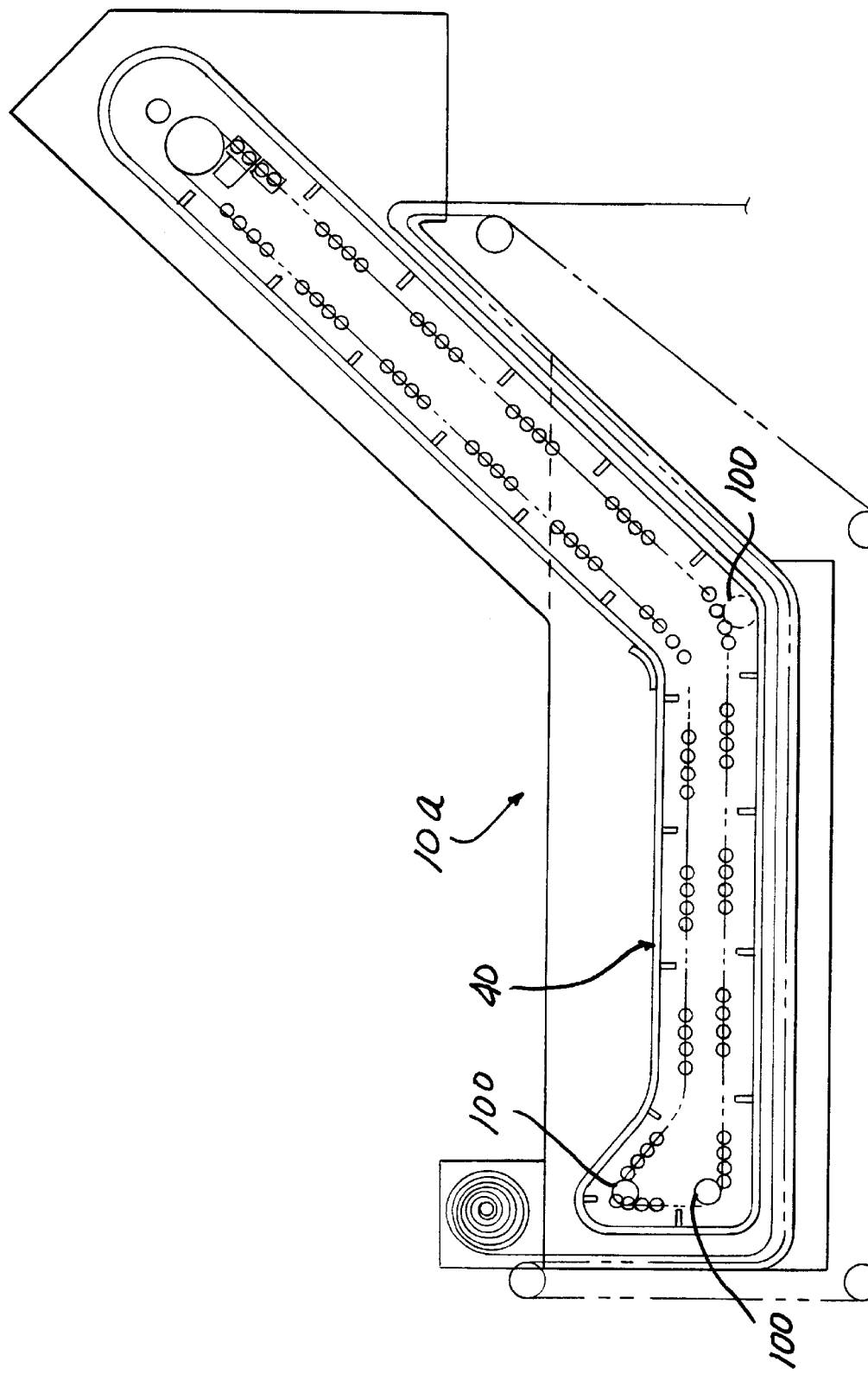
FIG. 9 is a diagrammatic sectional view of a filter apparatus according to the invention, with an alternative arrangement for recirculating the series of interconnected magnetized bars separately from the flight conveyor.
Figure 1:
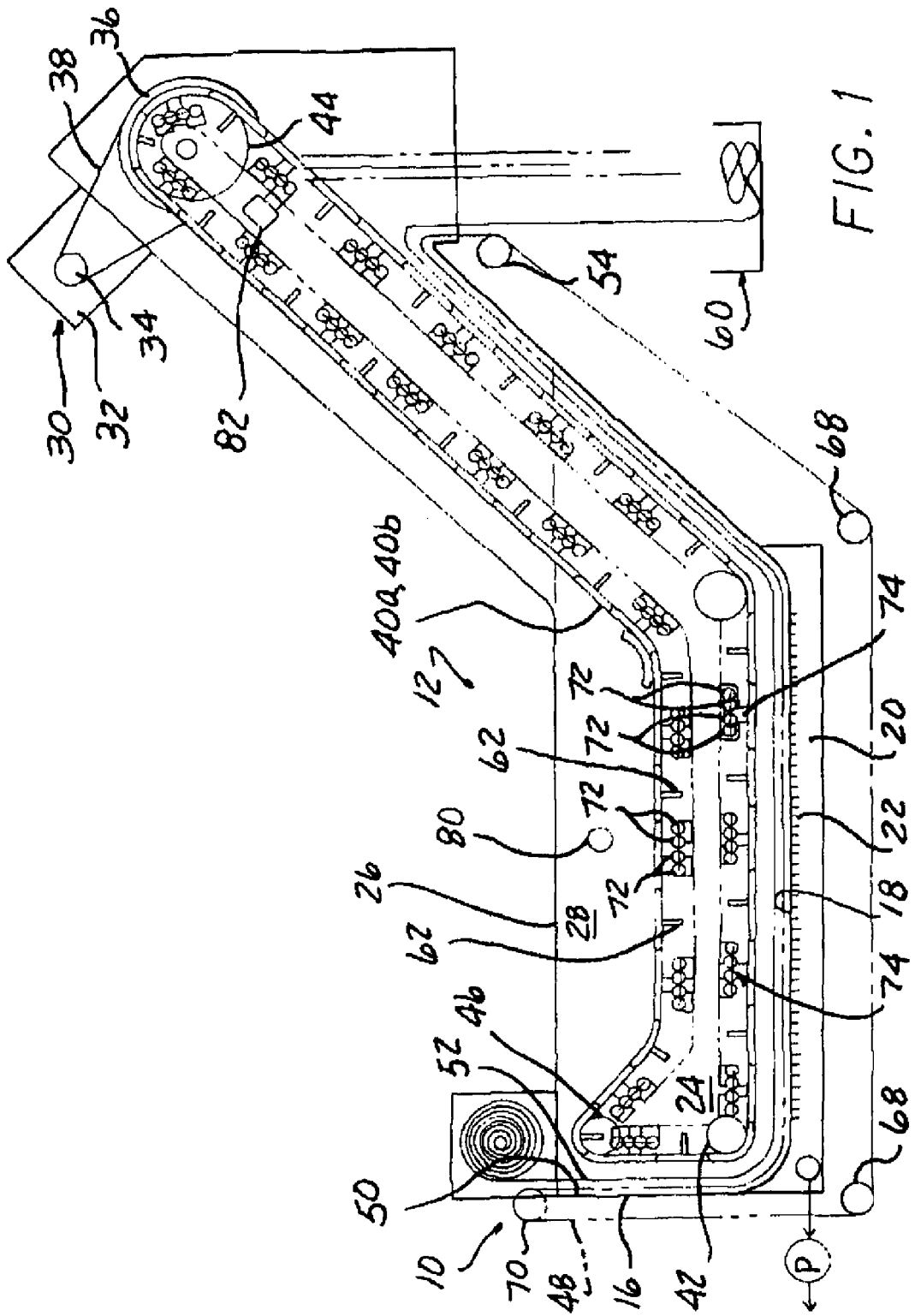
Figure 2:
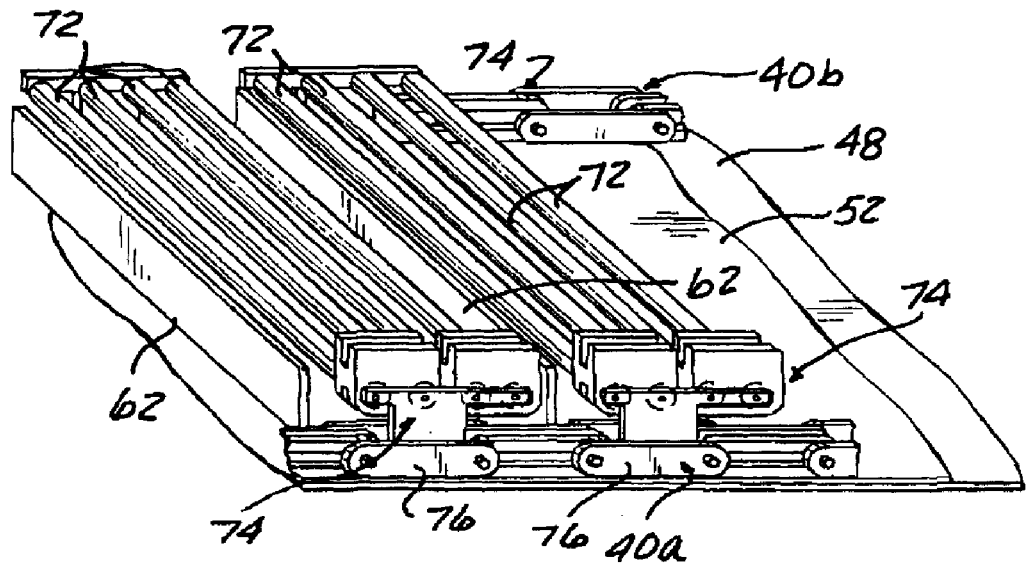
Figure 7:
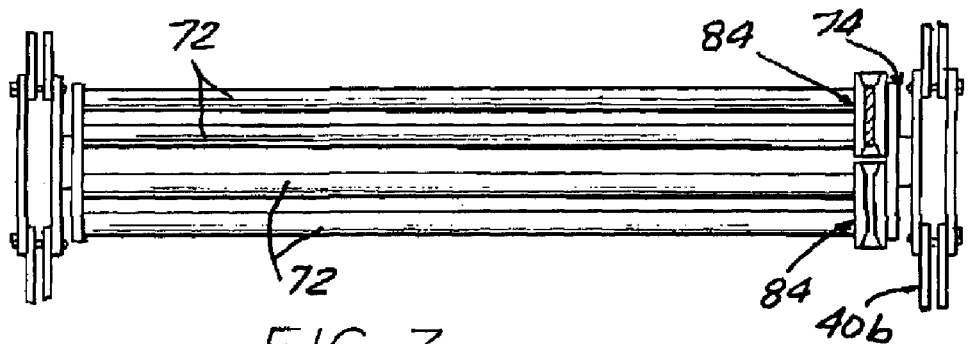
Figure 8:
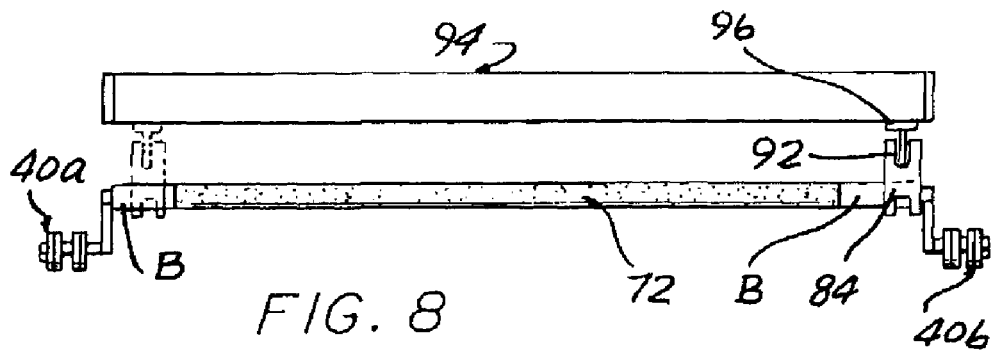
Figure 9:
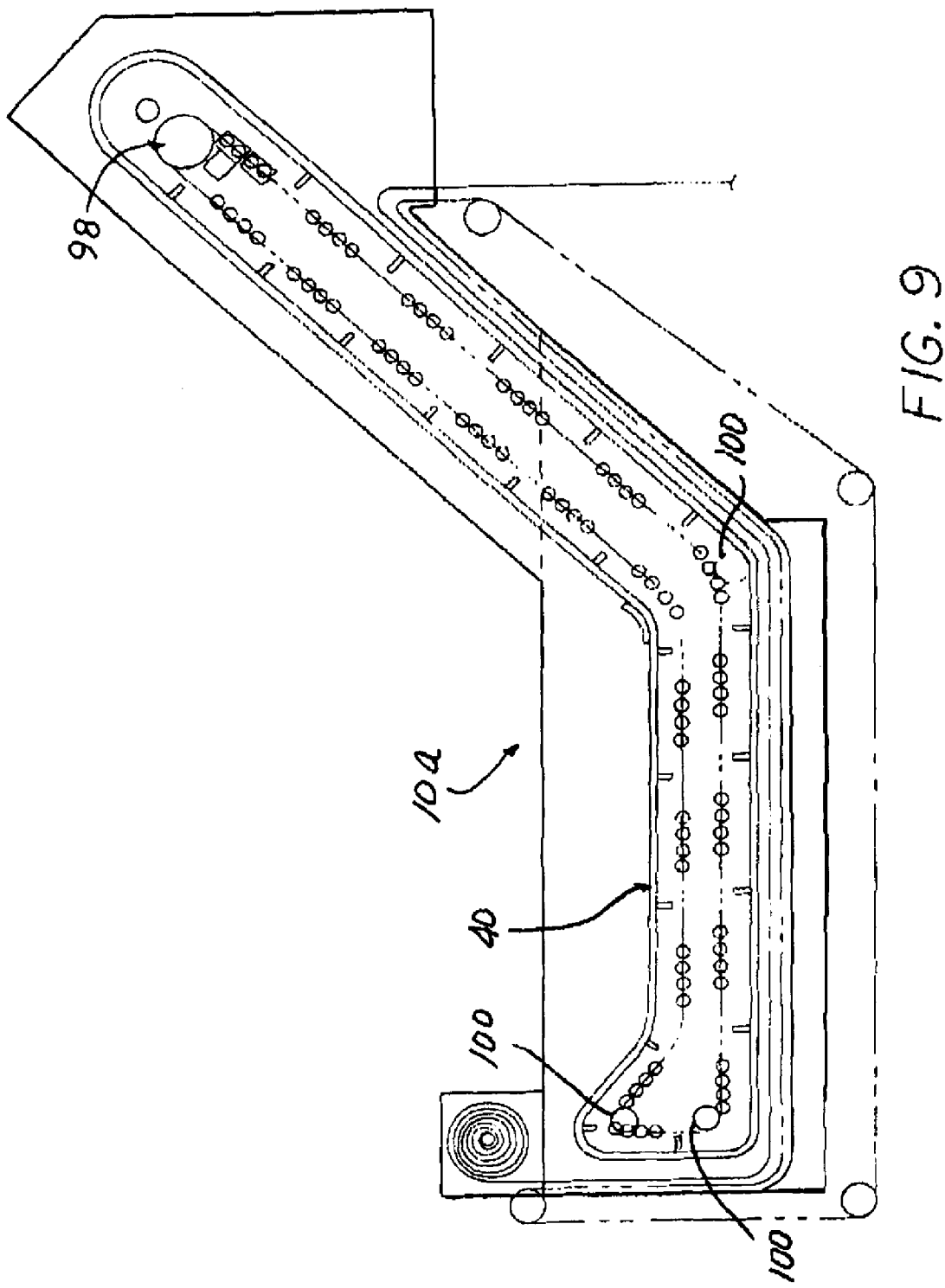

FIG. 9 shows a second embodiment of filter apparatus 10A, in which the interconnected series of magnetic bars 72 are mounted on chain loops 102 separate from the flight conveyor 50 may be recirculated separately from the chain light conveyor 40, along a path within the chain light conveyor 40 with its own separate drive 98 and guide rollers 100. In this case, separate guide tracks (not shown) would also be necessary.

What is claimed is:

1. A filter apparatus comprising:
   a tank adapted to receive a contaminated liquid to be filtered, said liquid containing ferrous metal particles to be removed;
   a vacuum box at the bottom of said tank having a wall section having distributed openings allowing outflow of liquid from said tank;
   an elongated sheet filter media arranged to be advanced through said tank so as to have a section overlying said vacuum box wall section, liquid outflow passing through said filter media section to be filtered thereby;
   an indexing drive for periodically advancing said filter media to bring a fresh section over said vacuum box;
   a series of permanently magnetized bars arranged side by side with intervening spaces therebetween, said bars interconnected together to form a train of magnetized bars extending about a closed path disposed at least partly within said tank, with a section thereof lying over said filter media section overlying said vacuum box wall section;
   a scraper station located along said path of said train of magnetized bars, having a scraper mechanism for scraping one or more bars in said scraper station.

2. The filter apparatus according to claim 1 further including a flight conveyor recirculated through said tank, said flight conveyor overlying said section of said filter media extending over said vacuum box wall, said flight conveyor having an indexing drive for periodically advancing the flight conveyor; and wherein said series of magnetized bars are mounted to said flight conveyor to be carried therewith so that said indexing drive of said flight conveyor comprises said indexing drive for said bar train.

3. The filter apparatus according to claim 1 wherein said scraper means includes scraper blocks slidable on said magnetized bars, said scraper blocks each having a slot extending therethrough, and further including a pusher plate at said scraper station adapted to be driven by an actuator cylinder at said scraper station, said slot of a respective scraper block receiving said pusher plate when moving into said scraping station.

4. The filter apparatus according to claim 1 wherein said train of magnetized bars extends back over said section of said bar train overlying said vacuum box.

5. A magnetic separator for removing ferromagnetic particles from a liquid, comprising:

a tank having an interior space for receiving liquid containing said particles a series of side by side spaced apart permanently magnetized bars, said bars interconnected together to form a train, said train of bars mounted to be movable through a path extending within said tank interior space;

a scraping station located along said path;

an indexing drive incrementally advancing said train of bars to bring each of said bars successively into said scraping station;

a series of scraper blocks including a scraper block mounted on each of said bars in said bar train to be carried therewith said train of bars is carried through said path in said tank interior space, said scrapper blocks each slidable on respective magnetized bars by being formed to receive a respective bar with a slidable fit thereto;

an actuator at said scraper station engaging each of said scraper blocks successively as associated bars are indexed into said scraper station;

said actuator stroking each of said engaged scraper blocks to be moved along the length of the bars to scrape accumulated particles from said bars and thereafter returned to a home position.

6. The magnetic separator according to claim 5 wherein said scraper blocks are each formed with a slot into which a pusher plate of said actuator moves as said scraper blocks are moved into said scraper station.

7. The magnetic separator according to claim 6 wherein each scraper block comprises a block of polymeric material having at least one hole extending from one side to the other of said block, size to slidably be received on one of said bars;

a relief space extending across said block between said sides of said block and partially intersecting said hole, forming a partial ring on each side of said blocks.

8. The magnetic separator according to claim 7 wherein a pair of side by side holes extend through each of said scraper blocks each slideably receiving a respective bar.

9. The magnetic separator according to claim 5 wherein each scraper block is mounted on two adjacent bars by being received in a respective one of a pair of holes extending through said scraper blocks.

10. The magnetic separator according to claim 5 wherein each of said magnetized bars has an unmagnetized end position onto which said scraper block slides when advanced down the length of said bars.

* * * * *

UNITED STATES PATENT AND TRADEMARK OFFICE
CERTIFICATE OF CORRECTION

PATENT NO. : 6,277,276 B1
APPLICATION NO. : 09/502145
DATED : August 21, 2001
INVENTOR(S) : Jack R. Bratten It is certified that error appears in the above-identified patent and that said Letters Patent is hereby corrected as shown below:

The title page, showing an illustrative figure, should be deleted and substitute therefor the attached title page.

Delete drawing sheets 1-4, and substitute therefor the drawing sheets, consisting of FIGS. 1-9. As shown on the attached pages.

Col. 4, line 15, delete "the scraper edge 56" and insert -- a scraper edge (not shown) --.

Signed and Sealed this

Eighteenth Day of August, 2009

David J. Kappos
*Director of the United States Patent and Trademark Office*

United States Patent
Bratten

(10) Patent No.: US 6,277,276 B1
(45) Date of Patent: Aug. 21, 2001

(54) FILTER APPARATUS WITH MAGNETIC SEPARATION

(76) Inventor: Jack R. Bratten, 5970 St. James Dr., West Bloomfield, MI (US) 48322

(*) Notice: Subject to any disclaimer, the term of this patent is extended or adjusted under 35 U.S.C. 154(b) by 0 days.

(21) Appl. No.: 09/502,145

(22) Filed: Feb. 11, 2000

(51) Int. Cl.$^7$ ............................................. B01D 35/06
(52) U.S. Cl. ...................... 210/223; 210/222; 210/396; 210/400; 210/416.1
(58) Field of Search ............................ 210/222, 223, 210/695, 396, 400, 416.1; 209/218, 226; 198/690.1

(56) References Cited

U.S. PATENT DOCUMENTS

| | | |
|---|---|---|
| 2,471,044 | 5/1949 | Scrivener . |
| 3,357,559 | 12/1967 | Israelson . |
| 3,428,179 | 2/1969 | Boyd, Jr. et al. . |
| 3,537,586 | 11/1970 | Hunkeler . |
| 3,834,542 | 9/1974 | Linstruth . |
| 3,985,647 | 10/1976 | Smith . |
| 4,031,011 | 6/1977 | Dorgathen . |
| 4,209,403 | 6/1980 | Dorgathen . |
| 4,261,826 | 4/1981 | Dorgathen . |
| 4,370,228 * | 1/1983 | Tashiro et al. ............... 210/400 |
| 4,394,264 | 7/1983 | Schimion et al. |
| 5,624,579 * | 4/1997 | Bratten ........................ 210/400 |
| 6,056,879 | 5/2000 | Schaaf et al. |
| 6,059,535 | 5/2000 | Wichmann et al. |

FOREIGN PATENT DOCUMENTS 41 30 421 C2  6/1993  (DE)

* cited by examiner

*Primary Examiner*—David A. Reifsnyder
(74) *Attorney, Agent, or Firm*—John R. Benefiel

(57) ABSTRACT

A filter incorporates a magnetic separator comprised of a series of side by side but spaced apart permanently magnetized bars interconnected to form a train, movably mounted through a tank into which is introduced liquid contaminated with ferromagnetic particles to be removed. The bar train includes a section overlying a vacuum box in the tank which also is overlain with a filter media to remove particles not removed by the separator. The bar train may be mounted to a flight conveyor included in the filter, or alternatively have its own support and drive. A scraper station is located at a discharge end of the tank for removal of accumulated particles from the bars. Scraper blocks are slidably mounted on the bars and remain there throughout the machine cycle, each of the blocks successively engaged with a plate on a band cylinder as the bars are moved into the scraping station. The cylinder is stroked to wipe the bars at the scraper station.

10 Claims, 4 Drawing Sheets

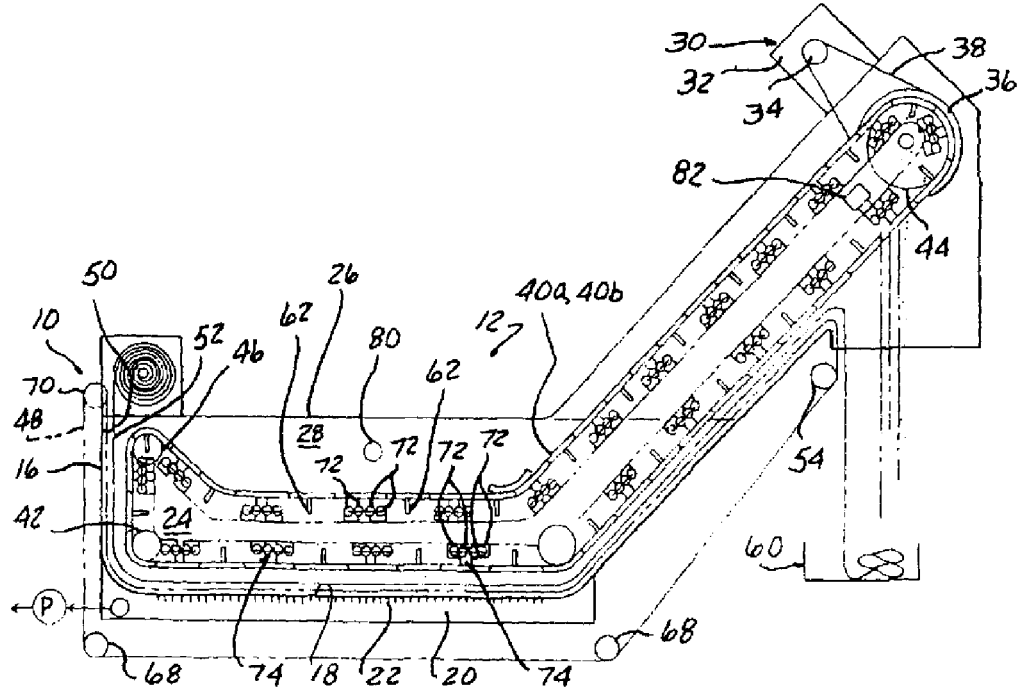

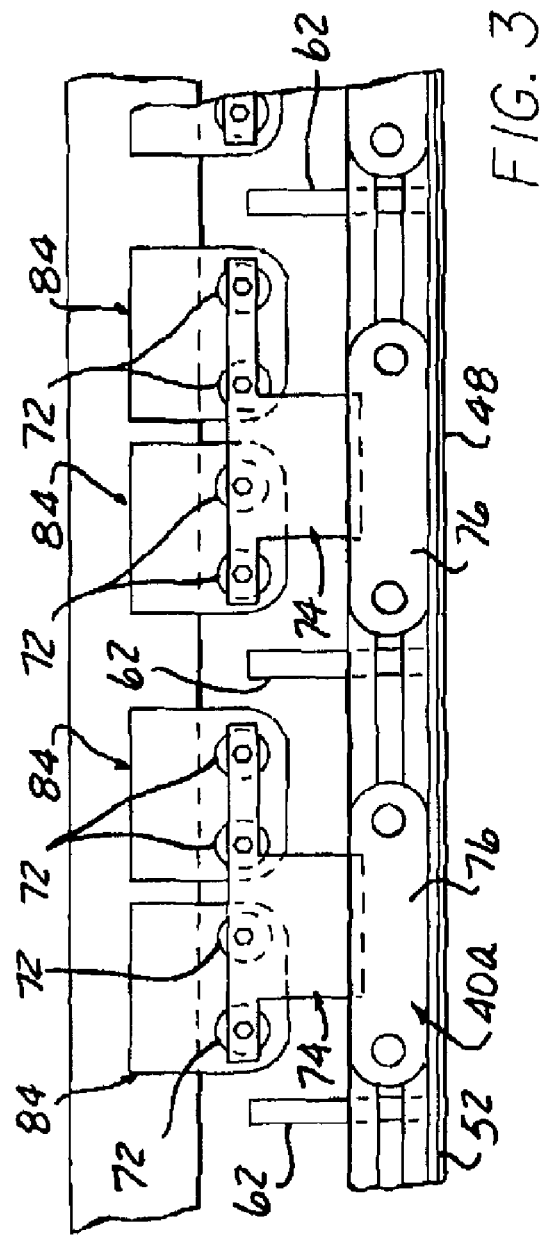
FIG. 3
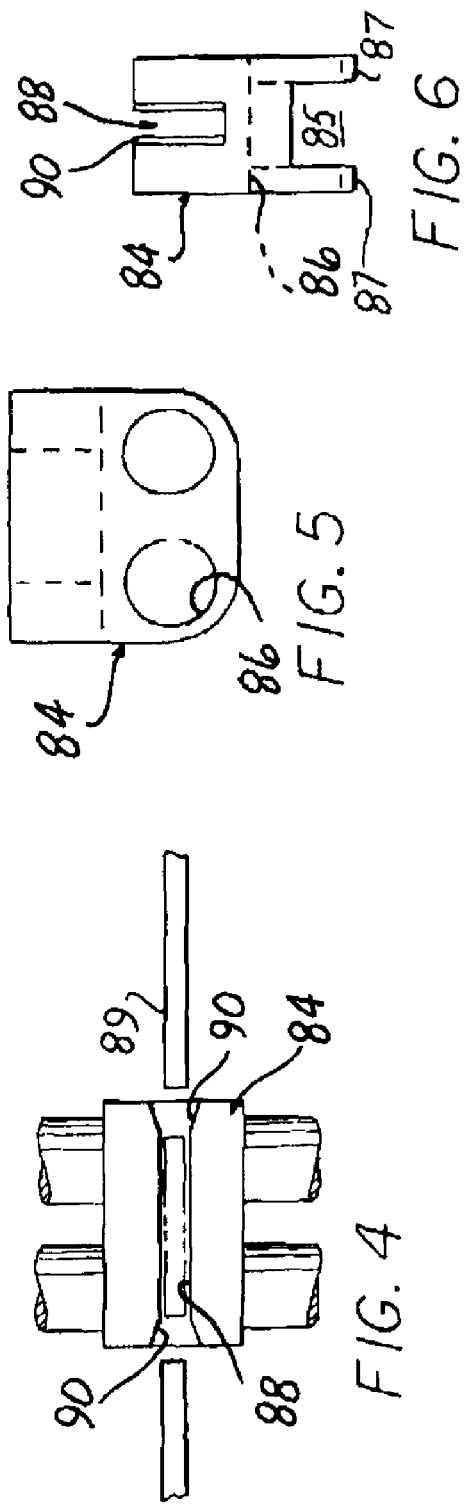
FIG. 6
FIG. 5
FIG. 4